# United States Patent

Louw et al.

[11] 3,804,318
[45] Apr. 16, 1974

[54] FRICTION WELDING APPARATUS
[75] Inventors: Johan August Louw, Orange; Robert Earle Ghiselin, New Port Beach, both of Calif.
[73] Assignee: Textron, Inc., Santa Ana, Calif.
[22] Filed: Aug. 24, 1972
[21] Appl. No.: 283,608

[52] U.S. Cl............... 228/2, 29/470.3, 156/73, 308/189
[51] Int. Cl............................................. B23k 27/00
[58] Field of Search......... 228/2; 29/470.3; 156/73; 308/189, 209

[56] References Cited
UNITED STATES PATENTS
| | | | |
|---|---|---|---|
| 3,352,611 | 11/1967 | Seidel | 308/189 |
| 3,484,926 | 12/1969 | Blum et al. | 29/470.3 |
| 3,578,232 | 5/1971 | Loyd et al. | 228/2 |
| 3,612,384 | 10/1971 | Loyd et al. | 228/2 |

Primary Examiner—J. Spencer Overholser
Assistant Examiner—Robert J. Craig
Attorney, Agent, or Firm—Nienow & Frater

[57] ABSTRACT

Friction welding apparatus for welding together workpieces of relatively small diameter, thus requiring relatively high rotational speed of one of the workpieces, there being angular contact bearings including preload biasing means for urging such bearings in a given direction to maintain such contact bearing operational wherein a high speed rotor or spindle is employed for rotating workpieces at its opposite ends and non-rotatable workpieces are substantially simultaneously brought into engagement from opposite ends. More particularly, such apparatus comprises high speed bearings which are preloaded with a force which is substantially constant throughout any imbalance of forces on or movement of the rotor due to imprecise engagement of said non-rotatable elements with said rotatable elements.

11 Claims, 5 Drawing Figures

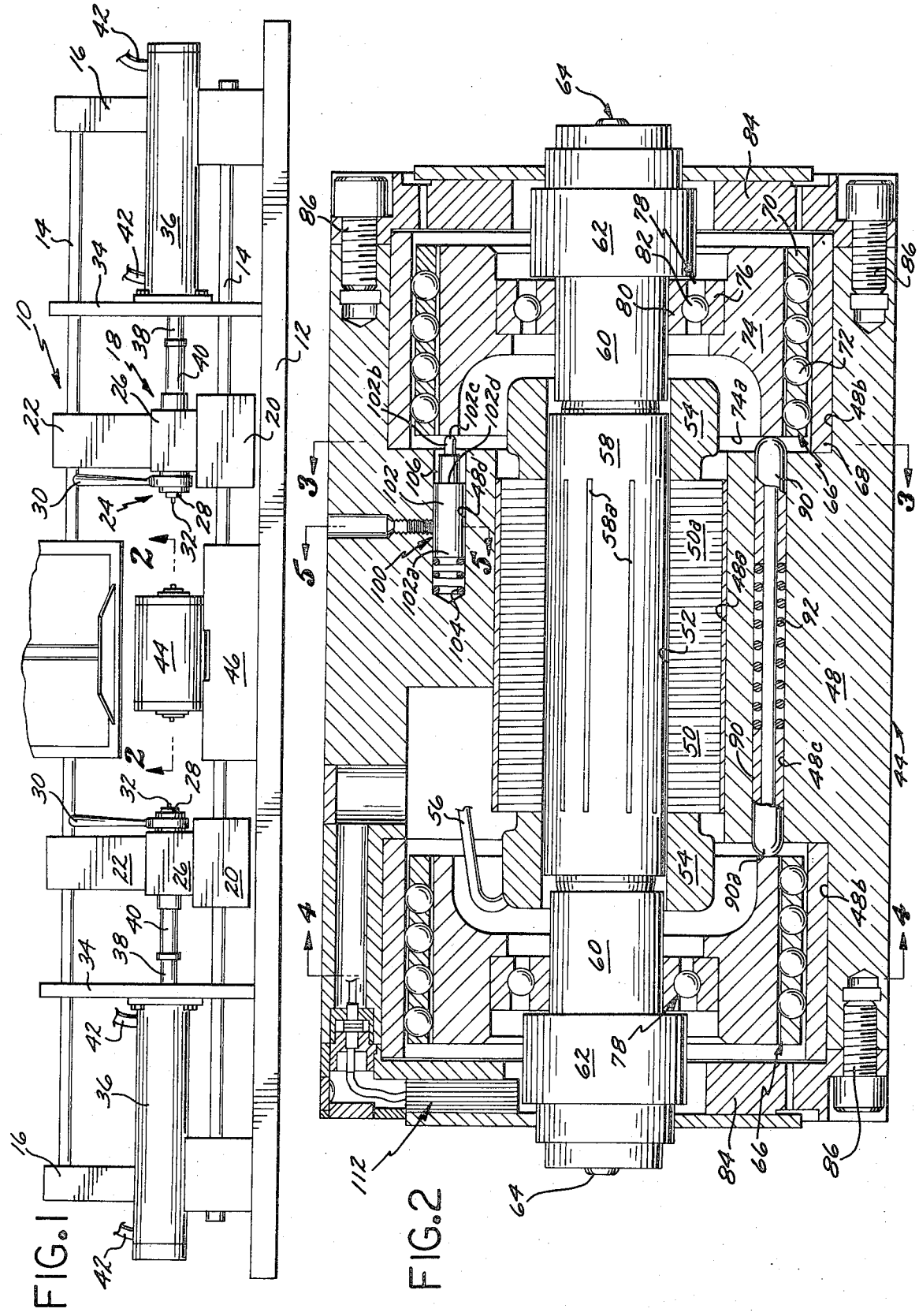

FIG. 3
FIG. 5
FIG. 4
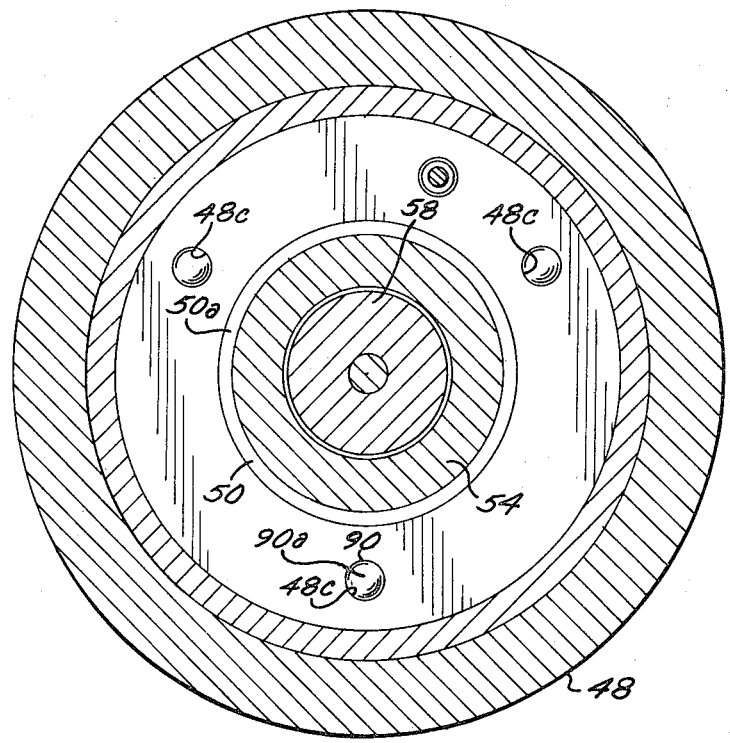
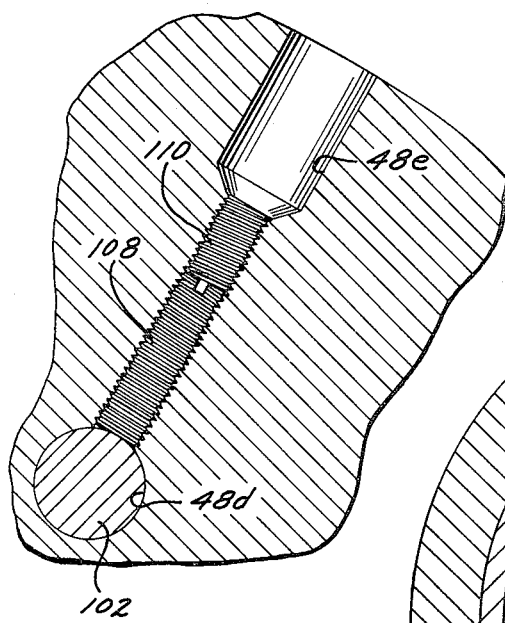
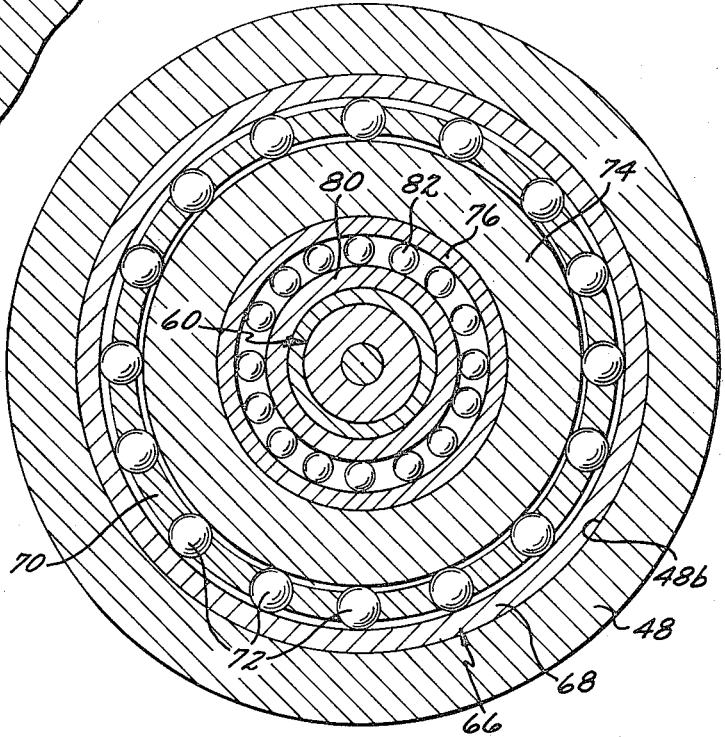

FRICTION WELDING APPARATUS

The present invention relates generally to friction welding apparatus, but more particularly to such apparatus wherein extremely high rotational speeds are required.

In friction welding of several workpieces, it is necessary to generate, through friction, the necessary heat to effect the desired weld. That is, as has been previously taught, one of the workpieces is held in a non-rotatable position, while the other workpiece is caused to rotate. Thereafter, the two workpieces are brought together so as to cause the energy in the rotating workpiece to be converted into heat by means of the frictional forces developed as a result of the contact. Such heat causes the material to reach a plastic condition so that the several workpieces are thereby welded together.

In the friction welding of relatively small parts, such as on the order of less than one-half inch in diameter, it is necessary to have the rotatable workpiece attain a relatively high rotational speed. This is required to ensure that the surface speed or lineal speed of the mating surfaces is great enough to produce the required heat energy to make the weld. If the workpieces are relatively large in diameter, the contact surface is much larger providing a greater average or mean contact radius. Thus, high angular or rotational speed is not necessary to produce the required heat.

Given such need for extremely high rotational speeds, it is then necessary to employ ball bearing assemblies which are capable of withstanding such speeds. Typically, such bearings should be of the preloaded angular contact type wherein a small force is necessary to keep the bearing races in close engagement with the balls. That is, with such extremely high speeds approaching 100,000 rpm, bearings other than the preloaded type have a tendency to become loose and chatter at high speeds, and eventually such bearings break down relatively quickly due to the unusual force involved.

With preloaded angular contact bearings, this does not result because such bearings have a biasing force which maintains the bearing balls in proper relation to the inner and outer races, even when the parts are rotating at an extremely high rate of speed. As above indicated, to ultimately make the weld, it is necessary to apply an axial thrust or force to the high speed rotating element. When this occurs, there is a certain amount of axial or rectilinear movement of the rotor and this has a tendency to change the biasing force on the contact bearing as normally loaded. The result of this has been that again the bearings become loose, and noisy and eventually breaks down. This results, of course, from the fact that as the rotor moves rectilinearly with respect to the housing, the usual preload on the bearing, which constitutes a biasing force between the bearing and the housing, is changed accordingly.

It is an object of the present invention to provide welding apparatus for welding relatively small workpieces.

Another object of the present invention is to provide welding apparatus as characterized above having angular contact bearings enabling the rotor to attain high rotational speeds.

An even further object of the present invention is to provide welding apparatus as characterized above which utilizes preload biasing means for maintaining the bearings in proper engagement throughout its operation.

A still further object of the present invention is to provide friction welding apparatus as characterized above which comprises means for preloading the bearings and wherein such preloading force does not change with rectilinear movement of the rotor.

Another object of the present invention is to provide in friction welding apparatus having a single rotor the opposite ends of which are used for holding and rotating workpieces, centering means for optimizing simultaneous and equal welding functions at opposite ends of the rotor.

A further object of this invention is to provide apparatus as characterized above having biasing means for locating such rotor in a mid-position between its several extreme positions.

An even further object of the present invention is to provide welding apparatus as characterized above which is simple and inexpensive to manufacture and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a fragmentary elevational view of friction welding apparatus comprising the instant invention;

FIG. 2 is a sectional view through the rotor of the apparatus of FIG. 1 taken substantially along line 2—2 thereof;

FIG. 3 is a sectional view substantially along line 3—3 of FIG. 2;

FIG. 4 is a fragmentary sectional view taken substantially along line 4—4 of FIG. 2; and FIG. 5 is a sectional view taken substantially along line 5—5 of FIG. 2.

Like reference characters indicate corresponding parts throughout the several views of the drawings.

Referring to FIG. 1 of the drawings, there is shown therein friction welding apparatus 10. Although such apparatus may take substantially any form, within the context of the present invention, the apparatus shown in FIG. 1 is mounted on a bench or platform 12. It comprises a pair of cylindrical rods or ways 14 which are supported on frame members 16 at opposite ends of the rods 14 to maintain the latter in rigid fixed position on the bench or platform 12.

Slidably mounted on ways 14 are a pair of moveable chucks 18, each of which has a lower guide member 20 and an upper guide member 22. Intermediate such guide members is a manual chuck 24 mounted on a housing 26.

Each chuck 24 comprises workpiece gripping means 28 and an operating handle 40 whereby a workpiece 32 can be mounted in the corresponding workpiece holder 28 and rigidly fixed there by suitable operation of the respective handle 30.

A pair of rigid frame members 34 are fixed to the platform or bench 12 as by welding or the like. A hydraulic ram or cylinder 36 is fixed to each such frame member 34, having its piston rod or arm 38 extending through a suitable opening in the corresponding frame member 34 toward the respective chuck assembly 24.

Suitable interconnecting means 40 are provided for connecting each piston rod 38 to its corresponding manual chuck 24. Hydraulic lines 42 are provided for conducting hydraulic fluid to and from each cylinder 36 for moving the corresponding piston rod 38 and chuck 24 rectilinearly, as will hereinafter become more apparent.

Mounted in the center of the apparatus 10, as view in FIG. 1, is a motor 44 on a platform 46.

Referring to FIG. 2 of the drawings, motor 44 comprises a housing 48 attached to platform 46 and having a central through-opening 48a for receiving the stator 50 of the motor. Such stator comprises a plurality of disc-like laminations 50a arranged contiguously with aligned through-openings affording a central opening 52. All of such laminations 50a are rigidly held together by appropriate threaded rods (not shown) and electric coils 54 are provided for completing the stator assembly. Suitable electrical wires or leads 56 bring alternating electrical current to the stator for operation of the motor in a conventional manner.

Mounted within the through-opening 52, is a rotor or spindle 58. Such rotor is formed with longitudinal grooves or slots 58a which divide the surface of the rotor 58 into longitudinal segments for cooperation with the rotating magnetic field afforded by the stator 50.

The opposite ends of rotor 58 are substantially identical in construction and are provided with a rotational beating portion 60, a thrust bearing portion 62 and a chuck body 64. Each chuck enables a workpiece to be firmly gripped and held in place as the rotor attains speed as will hereinafter become more apparent.

As shown at 48b, housing 48 is further formed with a cylindrical axial end opening at each of its opposite ends. Mounted within each such opening is minimum friction bearing means comprising a cylindrical outer bearing race 68 which fits firmly within opening 48b. A generally cylindrical ball retainer 70 is mounted within race 68, and includes a plurality of bearing balls 72 arranged not only axially as shown in FIG. 2 of the drawings, but also circumferentially as shown most clearly in FIG. 4. Thus, the retainer 70 "floats" in a minimum friction manner within the housing 48.

Positioned within the retainer 70 at each end of the rotor 48, is an inner race 74 having a relatively hard outer cylindrical surface for engagement with bearing balls 72. Such inner race 74 is firmly attached to the outer race 76 of a bearing 78.

Bearing 78 comprises the outer race 76 as well as an inner race 80 and a plurality of circumferentially spaced bearing balls 82. The inner race is firmly secured to bearing portion 60 of rotor 58. To enable this to take place, the thrust bearing portion 62 of rotor 58 is secured to the bearing portion 60 together with chuck 64 after bearing 78 is in place.

Each of the bearings 78 is unique to order to provide certain desirable functions. Firstly, such bearings must support the rotor or spindle 58 at relatively high speeds, on the order of 100,000 revolutions per minute. In order to maintain extreme accuracy in the resulting friction welds, the races 76 and 80 must remain close fitting so that there is no "play" between the parts. This is necessary to ensure that the axis of rotation of rotor 58 remains substantially constant or steady particularly at relatively high rotational speeds.

The close fit between the balls and races of bearing 78, as above described, is also necessary to prevent the bearings from being pounded and hence broken when there is play between the parts.

An end plate 84 is firmly secured to each end of housing 48 as by bolts 86 to complete the enclosing of the motor 44.

The housing 48 is formed with three through-openings 48c equiangularly placed about the axis of rotation of rotor 58 as shown most clearly in FIG. 3 of the drawings. Each such opening is aligned with the inner race 74 of bearing 66. A slidable plunger 90 is mounted in each end of each such opening 48c, and a compression spring 92 is interposed between each such pair of plungers 90. Each plunger is formed with a hemispherical end portion 90a for substantially single point engagement with a relatively flat end surface 74a of bearing race 74.

The compression springs 92 are selected such that the total force applied to each race 74 is from 10 to 50 pounds depending on the specific speeds and duty cycles required. It should be noted that such preload force is in the direction which urges race 76 and ball 82 into close engagement with race 80.

The bearing 78 is referred to as an angular contact bearing and, considering the rotational speed and the mass encountered, usually has a contact angle of approximately 8° for the instant application. This is, as above indicated, the plane of contact through the bearing 78 is not normal to or at right angles with the axis of rotation of rotor 58. Rather, such contact plane is at an angle of approximately 8° to such normal or right angle plane. The race 76 has a slightly inclined surface effect on the balls 82, urging it out of the corresponding end of the housing 48. Conversely, the race 80 has an inclined surface effect on the bearing balls 82 such as to urge them inwardly of housing 48. This produces the approximate 8° contact angle.

Referring to FIG. 1, once the workpiece chucked at the opposite ends of the rotor 58 are brought up to speed, the several hydraulic cylinders 36 are simultaneously actuated to cause the stationary workpieces 32 to move into engagement with the corresponding rotating workpieces. Hopefully, the non-rotatable workpieces will engage the rotating workpieces at substantially the same instant so that the corresponding thrust forces from the several hydraulic cylinders 36 are effectively concelled or balanced. However, such action does not always occur simultaneously but rather one non-rotatable workpiece will engage its rotating workpiece prior to engagement of the other workpieces. Since this is difficult to predict or control, it is desirable to have the rotor 58 centered within the housing 48 so that each end of the rotor is afforded the same amount of axial movement.

To this end, centering devices 100 have been provided in housing 48. There are two such centering structures, one working on each of the bearing races 74 at opposite ends of the rotor. Only one such centering device is shown in FIG. 2.

Each centering device comprises a plunger 102 which is substantially slidable within an opening 48d in housing 48. A compression spring 104, having a force of approximately one-half pound, is positioned between the end 102a of plunger 102 and the end of opening 48d. Each compression spring 104 thus urges its respective plunger 102 into engagement with bearing race 74 through a tip 102b having a hemispherical end portion 102c.

It is desirable to have the centering devices 100 effective only in the event the rotor 58 is "off center". That is, it is desirable to have the centering means be ineffective whenever the rotor does not require reaturn movement back to its center position. As such, the plunger 102 of each centering mechanism 100 is adjusted so as to bear against the bearing race 74 without applying any force thereto whenever the position of bearing race 74 defines the center position for rotor 58. To accomplish this, an adjustable limit stop member 106 is positioned near the end of plunger 102 for engagement with shoulder 102d on the latter.

To permit adjusting of limit stop 106, an opening is provided in housing 48 with several set screws 108 and 110 positioned therein. This enables the set screws to be removed and the limit stop 106 positioned as desired such that the effectiveness of the centering mechanism is removed when the rotor reaches its center position.

As above explained, for optimum operation of the high speed bearings 78, it is necessary to maintain the preload force within certain specific limits. This is necessary even under those conditions wherein one end of the rotor 58 is engaged by the corresponding non-rotatable workpiece before the opposite end is engaged by its workpiece. That is, even when such imbalance of forces on the rotor 58 cause axial movement thereof, it is necessary for the preload force on the bearings 78 to be substantially constant and within some relatively narrow limits.

The manner in which the various preload compression springs 92 are caused to operate insures that such preload force is always maintained. This is, since the compression springs 92 and plungers 90 are free to move axially with axial movement of the rotor 58, such rotor is caused to "float" upon linear bearings 72. Thus, as the rotor moves to one side, the preload force means moves with it thus maintaining the same application of force to the several high speed bearings.

It is thus seen that in the event that there is an imbalance of forces at the ends of the rotor 58, the preload force on the bearings is maintained constant even with axial movement of such rotor.

Shown in FIG. 2, mounted within housing 48, is tachometer apparatus 112 for use in determining the speed of rotation of rotor 58. Such apparatus 112 is associated with other equipment, for electrically sensing such speed.

It is thus seen that the present invention provides friction welding apparatus wherein relatively small diameter parts can be welded together in a quick and efficient manner.

We claim:

1. Friction welding apparatus comprising in combination, a housing, a rotatable element mounted within said housing and comprising a pair of oppositely disposed workpiece holders, two non-rotatable workpiece holders individually positioned in opposed relation to one of said rotatable workpiece holders and operable to be moved toward the same, bearing means comprising a bearing at each workpiece holder operatively interposed between said housing and said element to facilitate high speed rotation and predetermined rectilinear movement of said element within said housing, and preload force means operable to provide a substantially constant and equal force to both said bearings throughout said rectilinear movement of said element within said housing.

2. Friction welding apparatus according to claim 1 wherein said force means is operable to apply force to said bearing means substantially parallel to the direction of rectilinear movement of said element within said housing.

3. Friction welding apparatus according to claim 2 wherein said bearing means includes high rotational speed bearings and minimum friction bearings for rectilinear movement of said element.

4. Friction welding apparatus according to claim 3 wherein said force means comprises spring means operable on said high speed bearing but independent of said housing to enable said spring means to apply a substantially constant force to said high speed bearings ireespective of the position of said element relative to said housing.

5. Friction welding apparatus according to claim 4 wherein said high speed bearings comprises a bearing at each end of said element and said spring means comprises at least one compression spring the opposite ends of which are individually connected relative to a separate one of said bearings at opposite ends of said element.

6. Friction welding apparatus according to claim 5 wherein said housing is formed with a through opening for receiving said compression spring and wherein said compression spring is free to move with rectilinear movement of said element without thereby changing the force of said spring on said high speed bearings.

7. Friction welding apparatus according to claim 5 wherein each bearing of said high speed bearings comprises an inner bearing race fixed to said element and an outer bearing race which is free to move rectilinearly with said element, said compression spring being capable of apply opposite but equal force to said outer races of said bearings.

8. Friction welding apparatus according to claim 7 wherein said minimum friction bearings comprises an inner race fixed to each outer race of said high speed bearings and an outer race fixed relative to said housing.

9. Friction welding apparatus according to claim 8 wherein is included positioning means mounted in said housing and operable to move said rotatable element in either opposite rectilinear direction to a predetermined position.

10. Frction welding apparatus according to claim 9 wherein said positioning means is operable to center said rotatable element with respect to said housing.

11. Friction welding apparatus according to claim 10 wherein said positioning means comprises oppositely acting spring means for centering said rotatable element prior to the application of any forces on opposite ends thereof through said workpiece holders thereby equalizing the time of application of force at said opposite ends to better insure cancelling of forces created by said non-rotatable workpiece holders substantially simultaneously engaging the respective rotatable workpieces.

* * * * *